United States Patent
Yazami et al.

(10) Patent No.: US 10,270,113 B2
(45) Date of Patent: Apr. 23, 2019

(54) METAL BATTERY HAVING LIQUID ANODE AND LIQUID CATHODE

(71) Applicant: Nanyang Technological University, Singapore (SG)

(72) Inventors: Rachid Yazami, Singapore (SG); Kim Seng Tan, Singapore (SG)

(73) Assignee: Nanyang Technological University, Singapore (SG)

( * ) Notice: Subject to any disclaimer, the term of this patent is extended or adjusted under 35 U.S.C. 154(b) by 205 days.

(21) Appl. No.: 14/652,081

(22) PCT Filed: Dec. 13, 2013

(86) PCT No.: PCT/SG2013/000535
§ 371 (c)(1),
(2) Date: Jun. 12, 2015

(87) PCT Pub. No.: WO2014/092654
PCT Pub. Date: Jun. 19, 2014

(65) Prior Publication Data
US 2015/0333353 A1     Nov. 19, 2015

Related U.S. Application Data

(60) Provisional application No. 61/737,325, filed on Dec. 14, 2012.

(51) Int. Cl.
*H01M 8/1009* (2016.01)
*H01M 8/18* (2006.01)

(52) U.S. Cl.
CPC ......... *H01M 8/1009* (2013.01); *H01M 8/188* (2013.01); *H01M 2220/20* (2013.01); *H01M 2300/0028* (2013.01); *Y02E 60/528* (2013.01)

(58) Field of Classification Search
CPC ............... H01M 8/188; H01M 8/1009; H01M 2300/0028; H01M 2220/20; Y02E 60/528
USPC ......................................... 429/485
See application file for complete search history.

(56) References Cited

U.S. PATENT DOCUMENTS

| | | | |
|---|---|---|---|
| 2010/0141211 A1 | 6/2010 | Yazami | |
| 2010/0266907 A1 | 10/2010 | Yazami | |
| 2011/0189549 A1 | 8/2011 | Sun et al. | |
| 2014/0030623 A1* | 1/2014 | Chiang | H01M 8/225 429/434 |
| 2014/0072836 A1* | 3/2014 | Mills | C25B 1/04 429/8 |
| 2014/0363746 A1* | 12/2014 | He | H01M 10/052 429/406 |

OTHER PUBLICATIONS

Duduta et al., "Semi-Solid Lithium Rechargeable Flow Battery," *Advanced Energy Materials* 1:511-516, 2011.
"Materials Necessary for Stably Supplying Fuel Tritium to Fusion Reactors", *JAEA R&D Review 2008*, p. 40.
(Continued)

*Primary Examiner* — Gary D Harris
(74) *Attorney, Agent, or Firm* — Seed IP Law Group LLP

(57) ABSTRACT

The invention relates to a metal battery, and in particular, to a metal battery including a liquid anode and a liquid cathode. The metal batteries can operate at ambient temperature and can be prepared fully uncharged for safe transport and storage.

19 Claims, 12 Drawing Sheets

(56) References Cited

OTHER PUBLICATIONS

Nakajima, K. et al., "Lithium Ion Conductive Glass Ceramics: Properties and Application in Lithium Metal Batteries," Symposium on Energy Storage Beyond Lithium Ion; Materials Perspective, Oak Ridge National Laboratory, Oct. 7-8, 2010, 28 pages.
Presser et al., "The Electrochemical Flow Capacitor: A New Concept for Rapid Energy Storage and Recovery," *Advanced Energy Materials* 2:895-902, 2012.

* cited by examiner

100

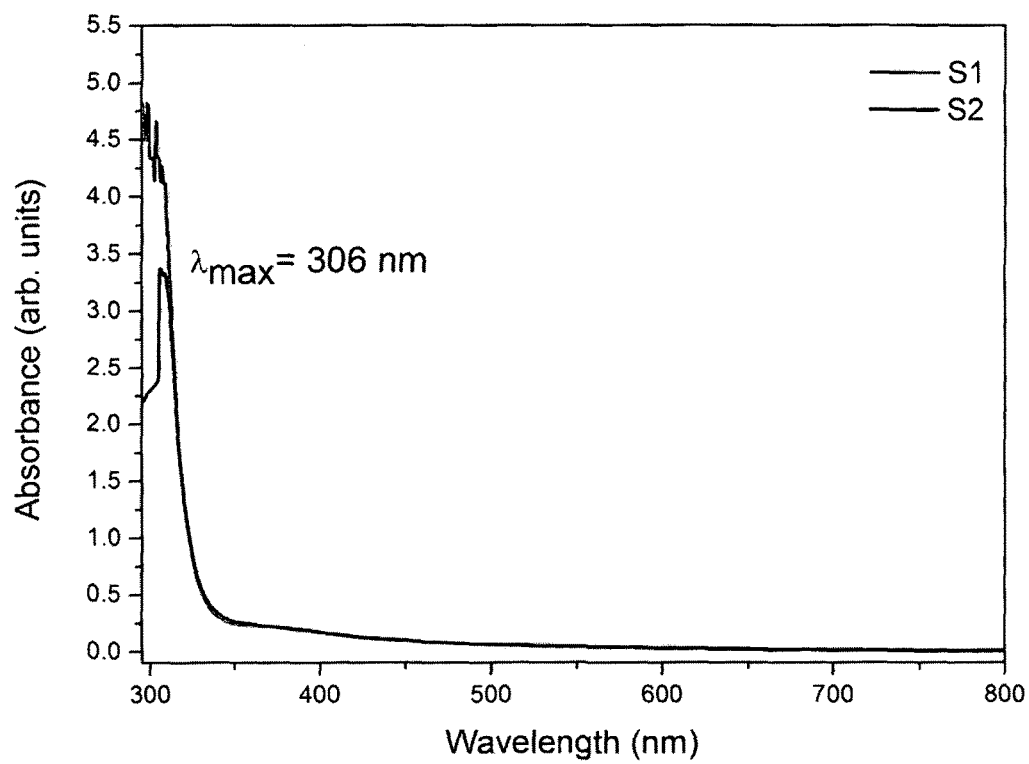

METAL BATTERY HAVING LIQUID ANODE AND LIQUID CATHODE

CROSS-REFERENCE TO RELATED APPLICATION

This application claims the benefit of priority of U.S. Provisional Patent Application No. 61/737,325, filed Dec. 14, 2012, the contents of which being hereby incorporated by reference in its entirety for all purposes.

TECHNICAL FIELD

The invention relates to a metal battery, and in particular, to a metal battery including a liquid anode and a liquid cathode. The metal batteries can operate at ambient temperature and can be prepared fully uncharged for safe transport and storage.

BACKGROUND

Currently, most electric vehicles (EVs) use rechargeable lithium ion batteries (LIB) which often require 30 min to 8 hours for recharging. At present moment, there is no known LIB that can be recharged in a few minutes for EVs without compromising the lifespan and performance. Workarounds to this problem involve replacing the spent battery packs with fully charged ones or using fast charging methods that speed up the charging process to about half an hour.

In recent years, a viable EV battery candidate that has drawn significant research interest is the rechargeable Li-Air battery (LAB) which has comparable energy density to gasoline. In particular, research on LAB is focused primarily on solid state electrode materials. LAB uses oxygen from the air as the cathode, which is available in abundance at no cost. However, there are several problems faced in contemporary LAB research and development that needs to be overcome. Firstly, Li metal is commonly used as the anode. Since Li metal is dangerous and does not allow for recharge (except for half cells), it is not ideal for anodes. Secondly, during discharge of LAB, the Li metal anode/ceramic electrolyte interface becomes unstable when the solid anode is used up. Thirdly, most important of all is the formation of $Li_2O_2$ on the cathode's current collector during cell discharge. This $Li_2O_2$ film passivates the surface of the current collector and isolates it from electrical contact with the electrolyte.

Therefore, there remains a need to provide for an alternative battery that overcomes, or at least alleviates, the above problems.

SUMMARY

Present inventors have demonstrated a new type of metal battery which can operate using a liquid anode (anolyte) and a liquid cathode (catholyte) at ambient temperature. There are several novel aspects offered by the present metal battery (also termed as cell):

Firstly, the open circuit voltage (OCV) of the cell is close to or higher than 3 V. Further, the liquid anode and liquid cathode systems disclosed herein provide faster ion transport medium as compared to conventional solid state anode and cathode systems. In addition to the faster ion transportion, the liquid anode and liquid cathode systems also provide an interface between electrodes and solid state electrolyte membrane with higher physical stability as compared to conventional solid state anode and cathode systems.

Advantageously, cells may be prepared either in a fully uncharged state, a partially charged state, or a fully charged state. Present cell is different from semi-solid flow energy storage devices which use slurry-based suspensions of solids as catholyte and anolyte [Presser, V. et al., *Advanced Energy Materials* 2012, 2, 895 and Duduta, M et al., *Advanced Energy Materials* 2011, 1, 511].

The depleted cell can be recharged in a variety of methods, one of which is replacing the spent liquids with fresh ones. This allows the cell to be replenished in minutes.

The $Li_2O_2$ passivation problem is resolved by using, for example, iodine, as the catholyte. Another way in which the $Li_2O_2$ passivation problem is resolved is by using an anion receptor additive such as a boron based compound, for example, Tris(pentafluorophenyl) Borane and other fluorinated and semifluorinated borate compounds, fluorinated and semifluorinated boronate compounds, fluorinated and semifluorinated boranes, phenyl boron compounds, azaether boron compounds, and other boron based compounds known to those skilled in the art. The $Li_2O_2$ passivation problem is also resolved by using an cation receptor additive, such as a crown ether, for example, 15-Crown-5, and 18-Crown-6, amongst other crown ethers known to those skilled in the art.

Thus, in one aspect of the disclosure, there is disclosed a metal battery including a liquid anode, a liquid cathode, and an electrolyte membrane separating the liquid anode and the liquid cathode. The liquid anode includes a first metal salt and an electron acceptor dissolved in a first solvent. The liquid cathode includes a second metal salt dissolved in a second solvent.

In another aspect, a metal battery including a liquid anode, a liquid cathode, and an electrolyte membrane separating the liquid anode and the liquid cathode is disclosed. The liquid anode includes a lithium halide and a polycyclic aromatic hydrocarbon dissolved in a first solvent. The liquid cathode includes a redox couple system, wherein the redox couple system includes an oxidized form and a reduced form of a species of a redox reaction.

In a further aspect, a method of charging present metal battery by subjecting the metal battery to cyclic voltammetry, chronoamperometry, or chronopotentiometry is disclosed.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 7 shows UV-Vis spectra of anolyte solutions of S1 and S2, where S1: uncharged anolyte and S2: charged anolyte at the $9^{th}$ cycle.

DESCRIPTION

Figure 1:
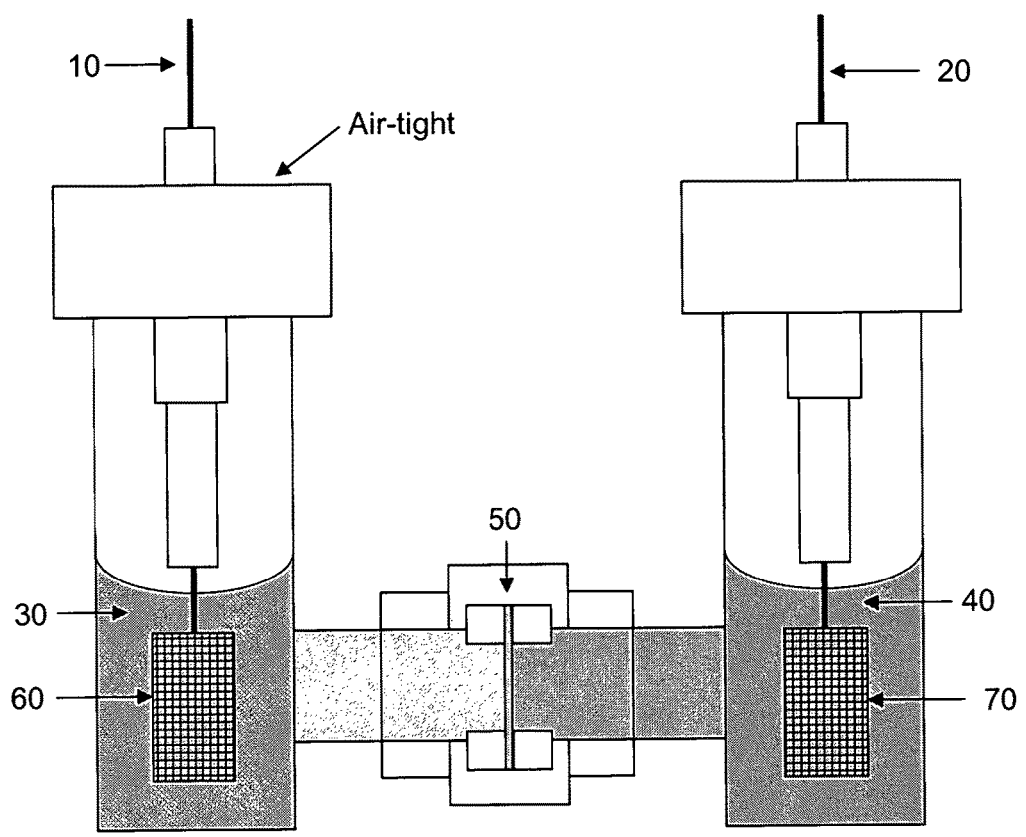
FIG. 1 shows a schematic diagram of the present cell.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Further, the terms and phrases used herein generally have their art-recognized meaning, which may be found by reference to standard texts, journal references and contexts known to those skilled in the art. The following definitions are provided to clarify their specific use in the context of the invention.

The term "electron donor metal" refers to a metal which transfers one or more electrons to another. Examples of electron donor metals include, but are not limited to, alkali metals, alkali earth metals, and lanthanide metals. Further examples of electron donor metals include metals such as zinc, gallium and aluminium.

The terms "electron acceptor" and "electron receptor" are used interchangeably, and refer generally to one or more species that accommodates an electron donated by the electron donor metal. Examples of electron acceptor include, but are not limited to, polycyclic aromatic hydrocarbon (abbreviated herein as "PAH") and organic radicals, such as butyl radicals and acetyl radicals.

Electron donor metals and electron acceptors may combine to form a "solvated electron solution", which refers to a solution containing free electrons that are not bound to a solvent or solute molecule, and instead, occupy spaces between the solvent and/or solute molecules. These free electrons are termed "solvated electrons". A solvated electrons solution generally contains a metal that is partially or completely dissolved in a solution, and electron acceptors. Solutions containing a solvated electron can have a blue or green color, due to the presence of the solvated electron. Further, when a solvated electron solution is reacted with water, hydrogen gas is generated. Anodes including a solvated electron solution allow for significantly increased energy density, specific power, and specific energy when compared with state of the art commercial lithium-ion based batteries.

The term "polycyclic aromatic hydrocarbon" (PAH) refers to a compound containing two or more aromatic rings. PAHs may include heterocyclic rings and heteroatom substitutions. Examples of polycyclic aromatic hydrocarbons include, but are not limited to, biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, and tetraphenylene.

The term "anion receptor" refers to a molecule or ion which can bind to or otherwise take up an anion in solution. Anion receptors useful in the present solutions, formulations and methods include, but are not limited to, fluorinated and semifluorinated borate compounds, fluorinated and semifluorinated boronate compounds, fluorinated and semifluorinated boranes, phenyl boron compounds, aza-ether boron compounds, Lewis acids, cyclic polyammonium compounds, guanidinium compounds, calixarene compounds, aza-ether compounds, quaternary ammonium compounds, amines, imidazolinium based receptors, mercury metallacycle compounds, silicon containing cages, and macrocycles. Examples of calixarene compounds include cobaltocenium-based receptors, ferrocene-based receptors, π-metallated cationic hosts, calix[4]arenes, and calix[6]arenes. Examples of aza-ether anion receptors include linear aza-ethers, multi-branched aza-ethers, and cyclic aza-crown ethers. Examples of mercury metallacycle anion receptors include mercuracarborands and perfluoro-o-phenylenemercury metallacycles. Examples of anion receiving silicon-containing cages and macrocycles includes silsesquioxane cages and crown silanes.

The term "cation receptor" refers to a molecule which coordinates with the metal cation to form a soluble species, thus enabling dissolution of an insoluble metal compound such $Li_2O_2$. Crown ethers are a class of cation receptors exhibiting chemical and physical properties beneficial for enhancing the dissolution of inorganic fluorides, including LiF. These compounds are useful for complexing with metal ions in solution. Crown ether cation receptors useful in the present invention include, but are not limited to, Benzo-15-crown-5, 15-Crown-5, 18-Crown-6, Cyclohexyl-15-crown-5, Dibenzo-18-crown-6, Dicyclohexyl-18-crown-6, Di-t-butyldibenzo-18-crown-6, 4,4(5)-Di-tert-butyldibenzo-24-crown-8, 4-Aminobenzo-15-Crown-5, Benzo-15-Crown-5, Benzo-18-crown-6, 4-tert-Butylbenzo-15-crown-5, 4-tert-Butylcyclohexano-15-crown-5, 18-Crown-6, Cyclohexano-15-crown-5, Di-2,3-naphtho-30-crown-10, 4,4'(5)-Di-tert-butyldibenzo18-crown-6, 4'-(5)-Di-tert-butyldicyclohexano-18-crown-6, 4,4'(5')-Di-tertbutyldicyclohexano-24-crown-8, 4,10-Diaza-15-crown-5, Dibenzo-18-crown-6, Dibenzo-21-crown-7, Dibenzo-24-crown-8, Dibenzo-30-crown-10, Dicyclohexano-18-crown-6, Dicyclohexano-21-crown-7, Dicyclohexano-24-crown-8, 2,6-Diketo-18-crown-6, 2,3-Naphtho-15-crown-5, 4'-Nitrobenzo-15-crown-5, Tetraaza-12-crown-4 tetrahydrochloride, Tetraaza-12-crown-4 tetrahydrogen sulfate, 1,4,10,13-Tetraoxa-7,16-diazacyclooctadecane, 12-crown-4, 15-crown-5, and 21-crown-7.

The term "organic radical" refers to an organic molecule having an unpaired electron.

The term "solvent" refers to a liquid that at least substantially or completely dissolves a solid, liquid, or gaseous solute, resulting in a solution. Liquid solvents can dissolve electron acceptors (such as polycyclic aromatic hydrocarbons) and electron donor metals in order to facilitate transfer of electrons from the electron donor metal to the electron acceptor. Examples of solvents include, but are not limited to, tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide.

The term "electrochemical cell" or "cell" refers to a device that converts chemical energy into electrical energy, or electrical energy into chemical energy. Generally, electrochemical cells have two or more electrodes and an electrolyte, wherein electrode reactions occurring at the electrode surfaces result in charge transfer processes. Examples of electrochemical cells include, but are not limited to, batteries and electrolysis systems.

The term "electrode" may refer to a "cathode" or an "anode". The terms "cathode" and "positive electrode" are used interchangeably, and refer to the electrode having the higher of electrode potential in an electrochemical cell (i.e. higher than the negative electrode). Conversely, the terms "anode" and "negative electrode", which are used interchangeably, refer to the electrode having the lower of electrode potential in an electrochemical cell (i.e. lower than the positive electrode). Cathodic reduction refers to a gain of electron(s) of a chemical species, and anodic oxidation refers to a loss of electron(s) of a chemical species.

"Electrode potential" refers to a voltage, usually measured against a reference electrode, due to the presence within or in contact with the electrode of chemical species at different oxidation (valence) states.

The term "electrolyte" refers to an ionic conductor which may be in a solid state, including in a gel form, or in a liquid state. Generally, electrolytes are present in the liquid state.

The term "supporting electrolyte" refers to an electrolyte whose constituents are not electroactive during charging or discharging of an electrode.

The terms "charge" and "charging" refer to process of increasing electrochemical potential energy of an electrochemical cell, which may take place by replacement of or addition of depleted active electrochemical materials with new active compounds. The term "electrical charging" refers to process of increasing electrochemical potential energy of an electrochemical cell by providing electrical energy to the electrochemical cell.

The term "metal salt" refers to an ionic species which comprises a metal cation and one or more counter anions, such that the metal salt is charge neutral, for example, having a net charge of zero.

The term "copper sulfate" refers to $Cu_2SO_4$ and/or $CuSO_4$.

The term "not reducible" as used herein refers to inability of an anion to undergo reduction reaction with a solvated electron solution.

In various embodiments, a metal battery, such as a lithium-air battery using a lithium solvated electron solution (LiSES) as a liquid anode (anolyte) and iodine as a liquid cathode (catholyte) is disclosed. The metal battery demonstrates a high open circuit voltage (OCV) of 3 V and higher. Cyclic voltammetry (CV) was employed to electrochemically generate LiSES and iodine in an initially uncharged cell (i.e. close to 0 V). The LiSES formation is confirmed via FTIR, UV-VIS, and a qualitative test. It is also shown that iodine can serve solely as catholyte or otherwise aid the homogeneous catalysis of oxygen reduction to prevent $Li_2O_2$ passivation of the cathode current collector during cell discharge. Present metal battery can operate at ambient temperature and can be prepared fully uncharged for safe transport and storage.

It will be understood that the terms "battery" and "cell" may be used interchangeable herein. A "battery" may consist of a single cell or of cells arrangement in series and in parallel to form a battery module or a battery pack. In present context, secondary batteries (i.e. rechargeable batteries) are of particular interest. For the purposes of illustration and brevity, it is also to be understood that while present disclosure has been described in detail with respect to lithium batteries, the scope of the invention is not limited as such.

As disclosed herein, a metal battery comprising a liquid anode, a liquid cathode and an electrolyte membrane separating the liquid anode and the liquid cathode is provided. The liquid anode comprises a first metal salt and an electron acceptor dissolved in a first solvent. The liquid cathode includes a second metal salt dissolved in a second solvent.

FIG. 1 shows a schematic diagram of the present metal battery 100. The metal battery 100 includes a liquid anode 30, a liquid cathode 40, and an electrolyte membrane 50 separating the liquid anode 30 and the liquid cathode 40. The electrolyte membrane 50 may be a Li-ion conducting ceramic membrane.

The liquid anode 30 includes a first metal salt and an electron acceptor dissolved in a first solvent. In various embodiments, the metal of the first metal salt is an electron donor metal. For example, the metal of the first metal salt may independently be selected from the group consisting of an alkali metal, an alkali-earth metal and a lanthanide metal. For example, the metal may be lithium, sodium or magnesium. The anion of the first metal salt may be a halide, such as iodide or bromide.

In the initial uncharged state, the metal battery 100 does not contain any solvated electron in the liquid anode 30. In the charged state (partially or fully), the liquid anode 30 may include lithium metal dissolved in a solution of electron receptors to form lithium solvated electrons solution (LiSES).

In various embodiments, the anion of the first metal salt is not reducible. This means that the anion is not able to undergo reduction reaction with a solvated electron solution.

In various embodiments, the electron acceptor or electron receptor may be provided by the polycyclic aromatic hydrocarbon (PAH) in the liquid anode 30. Examples of PAHs that may be used include, but are not limited to, biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, tetraphenylene, and a mixture thereof. Alternative electron acceptors may be ammonia, polyaromatic-amines, metal-azaporphyrinates, diimines, methylamine. Examples of suitable polyaromatic-amines may include 2-amino anthracene, 1-amino anthracene, 2-amino-chrysene, or 1-napthylamine.

In one embodiment, the electron acceptor in the liquid anode 30 is biphenyl.

In another embodiment, the electron acceptor in the liquid anode 30 is naphthalene.

Besides the above-mentioned, organic radicals, such as butyl radicals and acetyl radicals, may also be used as the electron acceptor. For example, the electron acceptor may be an alkyl radical, an alkene radical, or an alkyne radical, the electron acceptor may be n-butyl radical or tert-butyl radical.

The electron acceptor is dissolved in a first solvent, such as an organic solvent. In various embodiments, the first solvent is selected from the group consisting of comprises tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide, and a mixture thereof. For example, the first solvent may be tetrahydrofuran.

In one embodiment, the electron acceptor is biphenyl dissolved in tetrahydrofuran.

The liquid cathode 40 includes a second metal salt, such as but not limited to a lithium halide, dissolved in a second solvent. In various embodiments, the second metal salt has the formulae $M_pX_n$, wherein M represents the metal cation, n and p are stoichiometric coefficients, and X represents the anion, wherein X is selected from the group consisting of a halide, superoxide, peroxide, oxide, hexafluorophosphate, tetrafluoroborate, perchlorate, bis(oxalate)borate, trifluoromethanesulfonate, bis(trifluoromethanesulfonyl)imide (TFSI), sulfate, peroxosulfate, thiosulfate, permanganate, chromate and dichromate. For example, X may be a halide such as iodide.

In various embodiments, the metal of the metal battery, first metal salt, and the second metal salt may independently be selected from the group consisting of an alkali metal, an alkali-earth metal and a lanthanide metal. For example, the metal may be lithium, sodium or magnesium.

In the initial uncharged state, the liquid cathode 40 does not contain any dissolved halogen, such as iodine.

In various embodiments, the first metal salt in the liquid anode 30 and the second metal salt in the liquid cathode 40 may be the same. For example, the first metal salt in the liquid anode 30 and the second metal salt in the liquid cathode 40 may be lithium iodide.

In various embodiments, the second metal salt such as lithium iodide in the liquid cathode 40 may be dissolved in a second solvent, such as methanol. Other suitable second solvent may be water, sulfolane, dichloromethane, hexane, or carbon tetrachloride. Further suitable solvents may include esters, ethers such as tetrahydrofuran, diethyl ether, and dimethyl ether, carbonates such as propylene carbonate, ethylene carbonate, diethyl carbonate, and dimethyl carbonate, formol and formic acid.

In various embodiments where the metal battery 100 is in the uncharged state, the metal battery 100 does not contain any metal dissolved in the liquid anode 30 and further does not contain any dissolved metal halide in the liquid cathode 40. In various embodiments, the metal battery 100 does not contain any iodides in the liquid cathode 40.

In certain embodiments, the uncharged metal battery 100 may include a liquid anode 30 including lithium iodide and biphenyl dissolved in tetrahydrofuran. The uncharged metal battery 100 may further include a liquid cathode 40 including lithium iodide dissolved in methanol. The uncharged metal battery 100 can then be charged to electrochemically produce solvated electrons and iodine in the metal battery 100. For example, the metal battery 100 may be charged by cyclic voltammetry. Alternatively, the metal battery 100 may be charged by chronoamperometry, or chronopotentiometry. Chronoamperometry is based on time measurement of current during the applied potential step while chronopotentiometry is based on time measurement of potential under constant current density. Tests have been conducted to verify the successful electrochemical formation of LiSES in the liquid anode 30 after cyclic voltammetry charging (see examples section below).

In the charged state (partially or fully), the liquid cathode 40 contains halogen such as iodine dissolved in methanol. Lithium iodide may be added to both the liquid anode 30 and the liquid cathode 40 as a supporting electrolyte. Accordingly, in the charged state, the liquid anode may further comprise a dissolved metal, and/or the liquid cathode may further comprise a dissolved metal halide. For example, the dissolved metal halide may be an iodide.

The liquid anode 30 has two main advantages. Firstly, it possesses a fast ion transport capability. Secondly, it is able to achieve a stable anode/electrolyte membrane interface.

The iodine dissolved in methanol in the liquid cathode 40 has dual functions. First, it can serve solely as the liquid cathode 40 in the absence of oxygen as the cathode and second, it can serve in the homogenous catalysis of oxygen reduction when used with oxygen as the cathode. Similar to the liquid anode 30, the liquid cathode 40 is able to achieve a stable cathode/electrolyte membrane interface.

As mentioned previously, formation of $Li_2O_2$ on the cathode's current collector during cell discharge passivates the surface of the current collector and isolates it from electrical contact with the electrolyte. By including iodine in the catholyte, reduction of iodine in the catholyte solution takes precedence over reduction of oxygen with the consequence that $Li_2O_2$ is not directly formed on the current collector, but rather is formed indirectly in the solution. As such, the $Li_2O_2$ passivation problem is resolved.

Another way in which the $Li_2O_2$ passivation problem is resolved is by using an anionic receptor additive and/or a cationic receptor additive. Accordingly, in various embodiments, the liquid cathode may further include an anionic receptor and/or a cationic receptor. Examples of suitable anionic receptors and cationic receptors have already been described above.

As mentioned previously, one advantage of the present metal battery 100 is that the spent or depleted cell may be quickly recharged by replacing the spent liquid in the liquid anode 30 or the spent liquid in the liquid cathode 40. In an alternative, the spent liquid in the liquid cathode 40 may be recharged by recovering iodine from the spent liquid cathode 40.

Thus, in various embodiments, liquid cathode 40 may exposed to air or oxygen. By introducing air or oxygen to the liquid cathode 40, iodide present in the liquid cathode 40 can be oxidized to iodine, thereby recovering iodine from the spent liquid cathode 40.

While the oxidation of iodide to iodine process is thermodynamically possible, the rate of the oxidation is rather slow. Thus, in an attempt to enhance the rate of oxidizing iodide to iodine form spent liquid cathode 40, various catalysts have been explored. Present inventors have surprisingly found that by adding aqueous copper sulfate in methanol, followed by addition of the lithium halide, iodine can be recovered almost instantaneously. Thus, according to various embodiments, the liquid cathode may further include copper sulfate.

Referring again to FIG. 1, a first current collector 60 is placed in the liquid anode 30 and a second current collector 70 is placed in the liquid cathode 40. The respective current collector 60, 70 is electrically connected to a respective wire 10, 20, such as nickel, for measurements. The liquid anode 30 is maintained at air-tight condition, for example via an air-tight cap or seal. The liquid cathode 40, on the other hand, is not required to be maintained at air-tight condition. In other words, the metal battery 100 can operate in the absence of air or oxygen.

For illustration and brevity purposes, the present disclosure has been described in great details with respect to a liquid cathode including a lithium halide dissolved in a second solvent. It is to be understood and appreciated that the scope of the present invention is not limited to such embodiments. The liquid cathode may include a redox couple system, wherein the redox couple system comprises an oxidized form and a reduced form of a species of a redox reaction. In the illustration where the liquid cathode includes lithium halide such as lithium iodide, the redox couple system is $I_2/I^-$, wherein $I_2$ is the oxidized form while $I^-$ is the reduced form.

Thus, in accordance with a further aspect of the present disclosure, present metal battery includes a liquid anode, a liquid cathode, and an electrolyte membrane separating the liquid anode and the liquid cathode. The liquid anode includes a metal salt and an electron acceptor dissolved in a solvent. Examples of metal salt, electron acceptor, and solvent have already been discussed above. The liquid cathode includes a redox couple system, wherein the redox couple system includes an oxidized form and a reduced form of a species of a redox reaction.

In various embodiments, the liquid cathode includes a redox couple system selected from the group consisting of $I_2/I^-$, $VO_2^+/VO^{2+}$, $VO_2^+/V^{3+}$, $V^{3+}/V^{2+}$, $VBr_3/VBr_2$, $CrO_4^{2-}/Cr^{3+}$, $BrI_3^-/Br^-$, $ClO^-/Cl^-$, $ClO_2^-/Cl^-$, $MnO_2/MnO_4^-$ (acidified), $MnO_4^-/Mn^{2+}$ (acidified), $MnO_2/Mn^{2+}$ (acidified), $MnO_4^-/MnO_2$, $S_2O_8^{2-}/SO_4^{2-}$, $Cr_2O_7^{2-}/Cr^{3+}$ (acidified), $Br_2$ (aq)/$Br^-$, $Br_2(l)/Br^-$, $IO_3^-/I^-$, $Co^{3+}/Co^{2+}$, $Ce^{4+}/Ce^{3+}$, $Pr^{4+}/Pr^{3+}$, $Cu^{3+}/Cu^{2+}$, $FeO_4^{2-}/Fe^{3+}$, $O_3/O_2$, $NiO_4^{2-}/Ni^{2+}$, $Pb^{4+}/Pb^{2+}$, $H_2O_2/H_2O$, $BrO_4^-/BrO_3^-$, $HClO_2/HCl$, $HClO_2/Cl_2$, $H_5IO_6/IO_3^-$, $BrO_3^-/Br_2$, $Rh^{6+}/Rh^{4+}$, $Rh^{6+}/Rh^{3+}$, $ClO_3^-/Cl_2$, $ICl_3/I_2$, and $ClO_2/HClO_2$.

In one embodiment, the liquid cathode includes a $I_2/I^-$ redox couple system.

In the following paragraphs, experimental work detailing the preparation and testing results of a fully charged cell, an uncharged cell, FTIR and UV-VIS analysis of anolyte solutions will be described.

In order that the invention may be readily understood and put into practical effect, particular embodiments will now be described by way of the following non-limiting examples.

Examples

Materials. Anhydrous LiI is purchased from Alfar Aesar. Lithium foil, iodine, anhydrous methanol, anhydrous THF and biphenyl are purchased from Sigma Aldrich. The Li-ion conducting ceramic membrane, lithium aluminium titanium phosphate (LATP), is purchased from Ohara. The plastic components of the cell are machined from PEEK (Poly-ethy-ether-ketone). The anolyte and catholyte chambers are made of glass.

Chemically Prepared Cell. For this experiment, the USES anolyte's composition is 1.0 M/L $Li_{1.0}\beta(THF)_{12.3}$ where $\beta$ denotes biphenyl. The catholyte consists of 0.1 M/L of $I_2$ in methanol. In both anolyte and catholyte, the concentration of the LiI salt (supporting electrolyte) is 0.50 M/L. The initial OCV of the cell is 2.83 V, which is close to the expected value of 2.89 V. This is because the standard electrode potential of biphenyl-based Li-SES is 0.68V versus Li and that of $I_2/I^-$ is 3.57 V versus Li.

Figure 2:
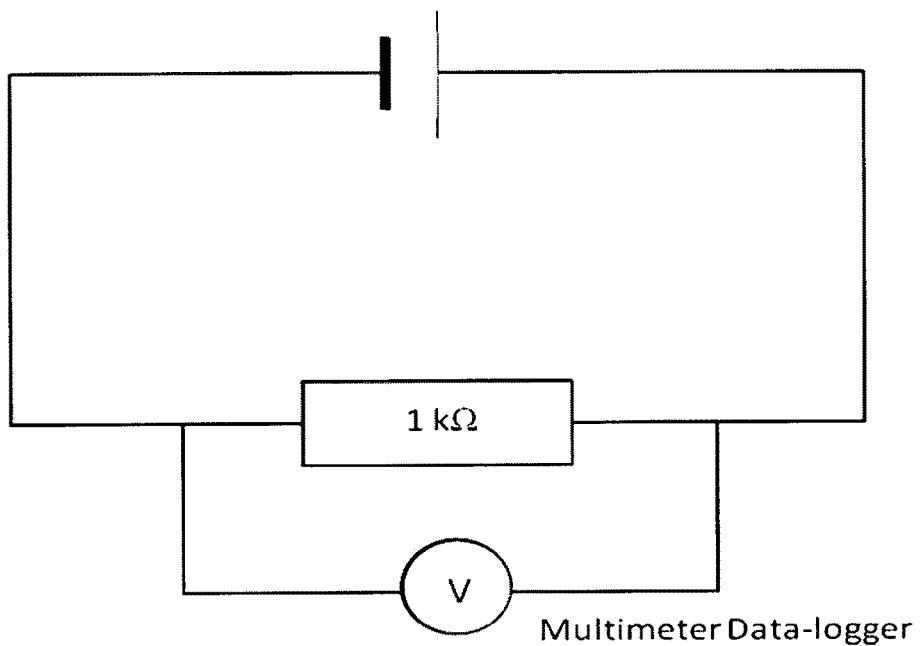
FIG. 2 shows a circuit diagram for constant 1 kΩ resistance load discharge.
Figure 3A:
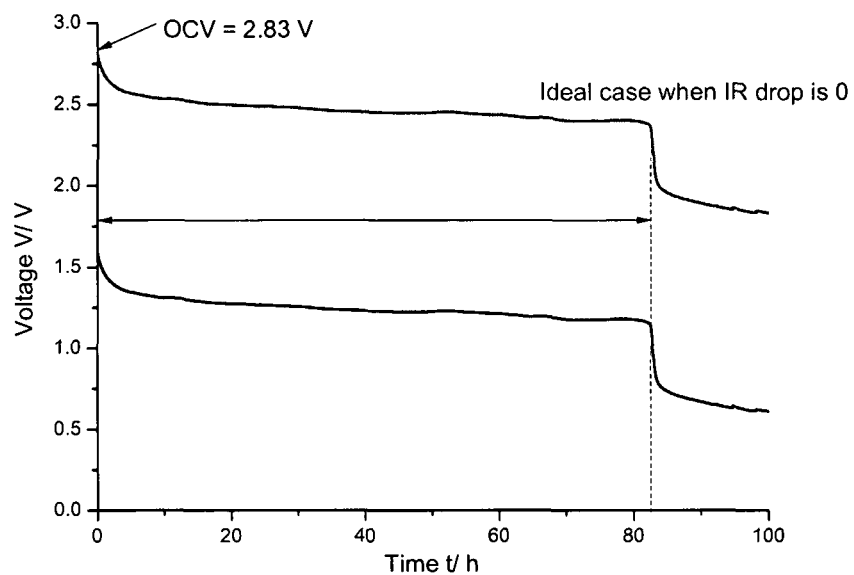
FIG. 3A shows a cell discharge profile V versus t. An ideal situation when ohmic drop is zero is also shown for comparison ($LiSES/I_2$ cell).

The cell is then connected to a 1 k$\Omega$ resistor as shown in the circuit diagram in FIG. 2 and discharged for more than 100 hours. There is a noticeable drop from 2.83 V to 1.61V when the cell is first connected to the resistor. This large drop could be attributed to the internal resistance of the whole cell. FIG. 3A shows the discharge profile of the cell. The idealized scenario when there is no voltage drop is also shown for reference. Two plateaus can be clearly seen from the graph.

Figure 3B:
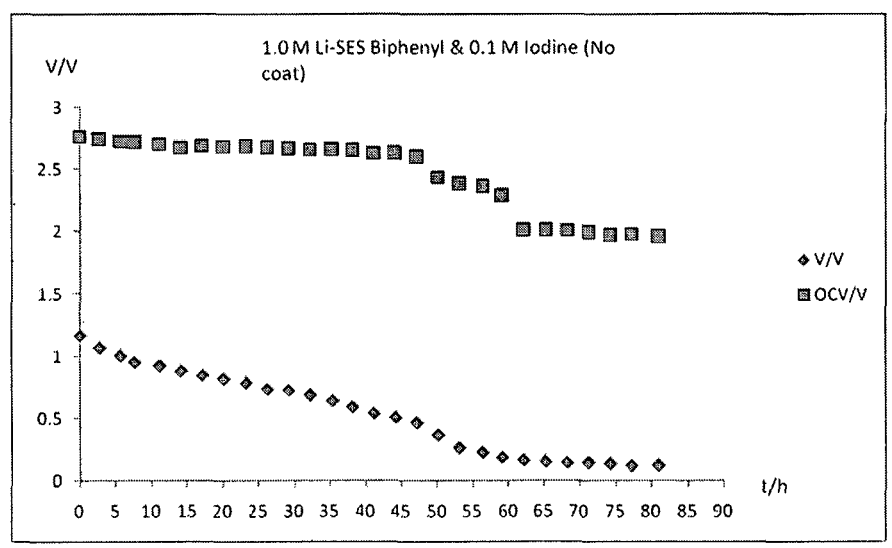
FIG. 3B shows cell discharge profiles OCV versus t and V versus t ($LiSES/I_2$ cell).

FIG. 3B shows the OCV and discharge voltage (V) profile of a cell consisting of 1.0 M/L $Li_{1.0}\beta(THF)_{12.3}$ 0.1 M/L of $I_2$ in methanol and 0.1 M/L of LiI in both anolyte and catholyte. The supporting LiI electrolyte in this cell is lower in concentration as compared to the previous cell. When the cell is freshly prepared, its initial OCV is 2.79 V. This cell is also discharged across a 1 k$\Omega$ resistor in the same circuit configuration as shown in FIG. 2.

Each one of the OCV readings are obtained by disconnecting the cell from the load during discharge and reconnecting back. Two plateaus can be clearly seen from both OCV versus t and V versus t graphs. For both FIG. 3A and FIG. 3B, by the end of the first plateau in the graphs, the catholyte has become colourless, indicating all the $I_2$ has been converted to $I^-$. The catholyte turned from dark red to light yellow, then to colourless as time passes.

Electrochemically Prepared Cell. In the charged state, both the LiSES and $I_2$ are prepared chemically and loaded into the cell, whereas in the uncharged state, the cell is charged to form the iodine catholyte and LiSES anolyte.

In the uncharged state experiment, the anolyte used is 0.9 M/L of lithium iodide in a solution of 0.5 M/L biphenyl in THF. The catholyte used is 0.9 M/L of lithium iodide dissolved in methanol. 25 ml of each solution is used for the cell. Initially, both anolyte and catholyte are colourless. Earlier studies on electrochemical generation of solvated electrons have shown that solvated electrons that are thus formed are stable at ambient temperature in several types of solvents.

The initial OCV of the cell is close to 0V. For cyclic voltammetry conducted in argon atmosphere, glass coated magnetic stirrers are placed in both anolyte and catholyte chambers to aid the mass transport of the ions in the solutions. The cell is first charged to 4.4V and then cycled between 0.8 V and 4.4 V for 8 cycles. With each cycle, the colourless catholyte gradually turns dark orange, an indication of the formation of $I_2$ from $I^-$ in the methanol. The colourless anolyte becomes a very pale amber colour. With each charge/discharge cycle, the colours of the solutions intensify, indicating the possibility of some irreversible processes occurring during each cycle. This goes on until the 9$^{th}$ cycle whereby cycling is stopped at 4.4 V. The OCV of the cell is 2.97 V when cycling is stopped. The CV is shown in FIG. 4A.

Figure 4A:
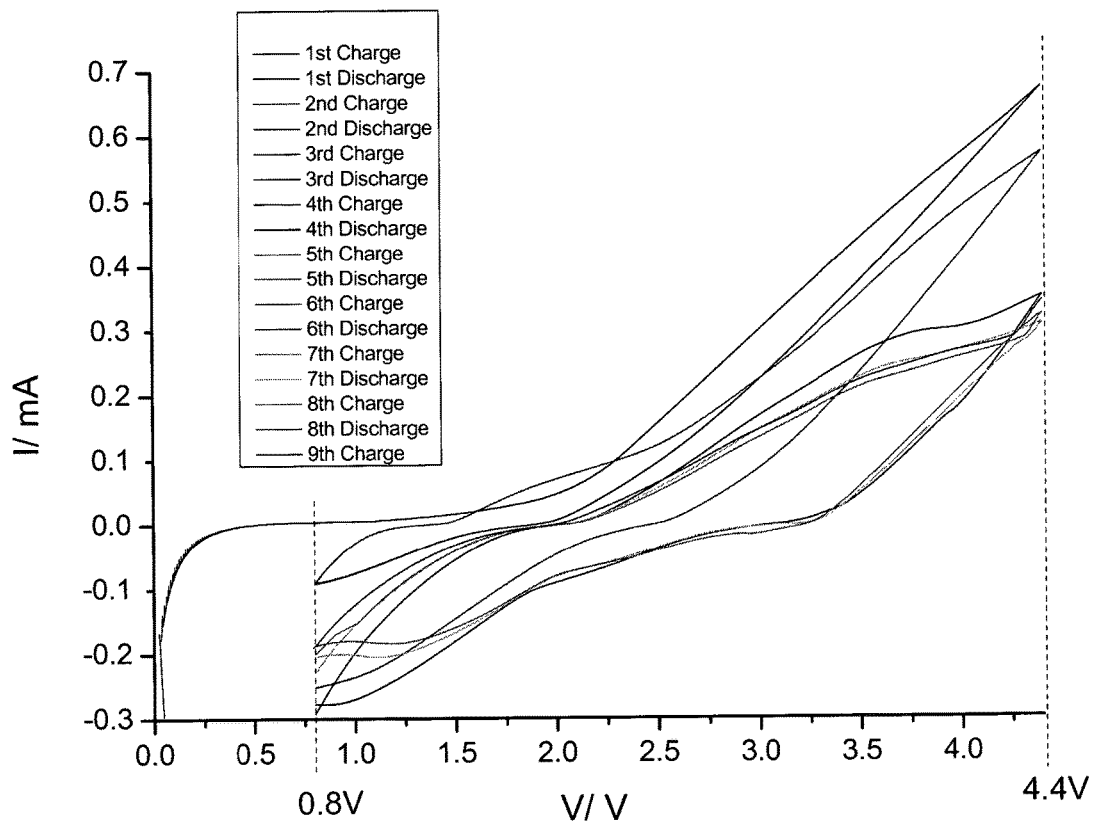
FIG. 4A shows cyclic voltammetry (CV) profile for charging/discharging a cell prepared in the uncharged state.
Figure 4B:
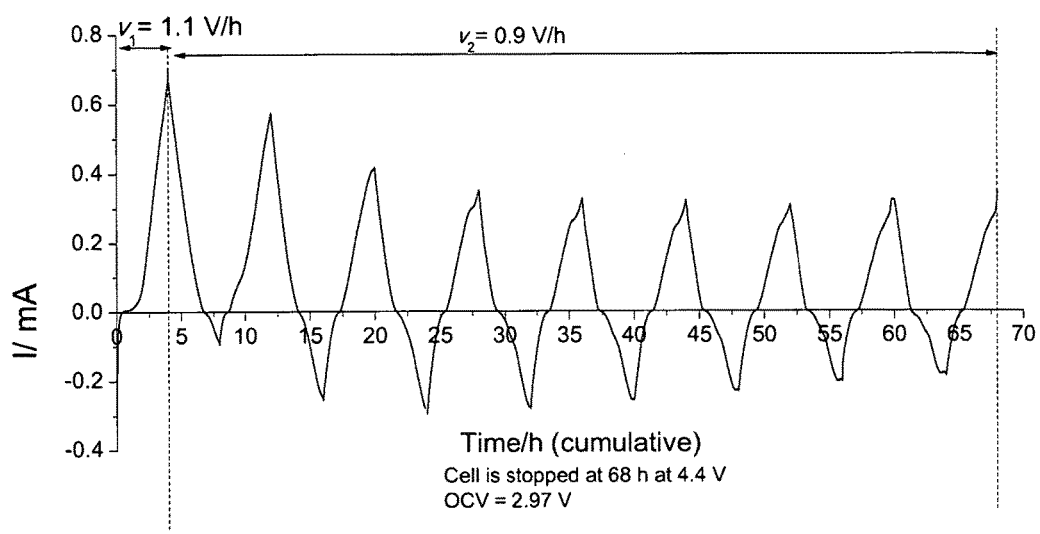
FIG. 4B shows a graph of I versus t replotted from the CV data of FIG. 4A.

From FIG. 4A, it can be seen that the cell becomes more stable by the 4$^{th}$ cycle. When the current is plotted against time from the CV data, we get the following graph in FIG. 4B. From the areas under each cycle and the scan rate, we can determine the amount of charge transferred during each charge/discharge cycle. The concentration of LiSES formed after each cycle is tabulated in Table 1. The % cycle efficiency of the first cycle is the lowest among all the cycles followed by the second cycle. After the third cycle, the cycle efficiency for each subsequent cycle is always more than 50%. Hence the first three cycles can be considered as the formation cycles. The cell stabilizes only by the fourth cycle. From the CV results, at the end of the $9^{th}$ cycle charge, the LiSES formed in the anolyte is 0.007 M/L and the $I_2$ formed in the catholyte is $3.72 \times 10^{-3}$ M/L, which is about half of the concentration of the LiSES formed.

The cell is removed from the glovebox and a few drops of the anolyte are added to dilute HCl. The immediate evolution of hydrogen gas bubbles indicates the presence of solvated electrons and that Li-SES has been formed in the anolyte solution. Separately, a Li-SES solution of the composition $Li_{2.0}\beta(THF)_{22.2}$ is also prepared chemically for FTIR analysis. A few drops of this Li-SES is also added to a beaker of dilute HCl. In this case, the evolution of hydrogen gas bubbles has also been observed.

Exposure of the catholyte to air changes its colour to dark orange after some time indicating the recovery of iodine from iodide ions in the spent cathode solution.

TABLE 1

Concentration of Li-SES formed after each cycle

| No. of cycles | $q_{charged}$/ mAh | $q_{discharged}$/ mAh | Efficiency (%) | Concentration of LiSES formed after each cycle/ (M/L) | Concentration of Iodine formed after each cycle/ ($\times 10^{-3}$ M/L) |
| --- | --- | --- | --- | --- | --- |
| 1 | 1.5833 | 0.0721 | 4.6 | 0.002 | 1.13 |
| 2 | 1.4438 | 0.3693 | 25.6 | 0.004 | 1.93 |
| 3 | 0.9693 | 0.4746 | 49.0 | 0.005 | 2.30 |
| 4 | 0.7594 | 0.4790 | 63.1 | 0.005 | 2.51 |
| 5 | 0.7070 | 0.4641 | 65.6 | 0.005 | 2.69 |
| 6 | 0.6869 | 0.4266 | 62.1 | 0.006 | 2.88 |
| 7 | 0.6876 | 0.3489 | 50.7 | 0.006 | 3.14 |
| 8 | 0.8007 | 0.4884 | 61.0 | 0.007 | 3.35 |
| 9 | 0.4889 | | | 0.007 | 3.72 |

Figure 5:
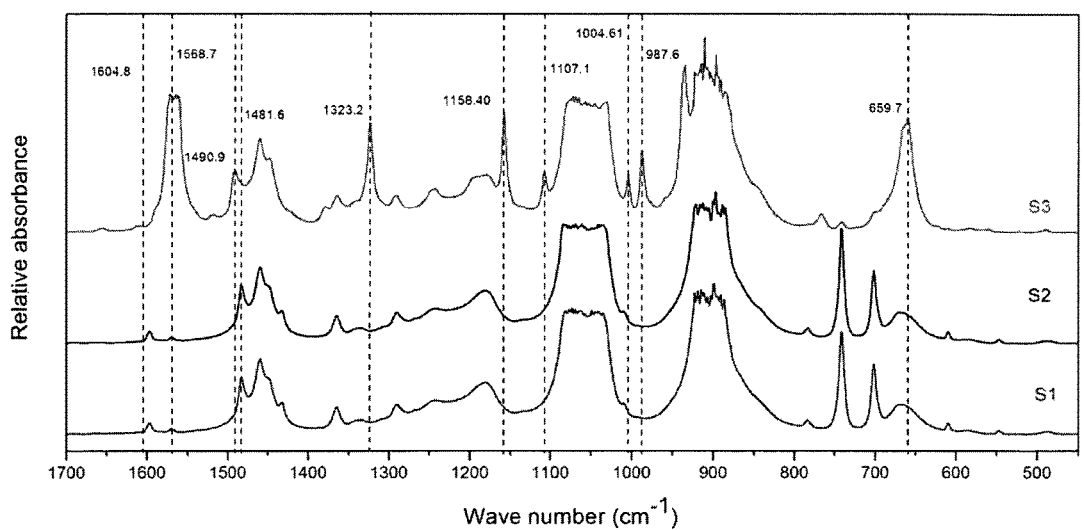
FIG. 5 shows FTIR spectra of S1: uncharged anolyte; S2: charged anolyte at the $9^{th}$ cycle; and S3: Chemically prepared Li-SES.
Figure 6:
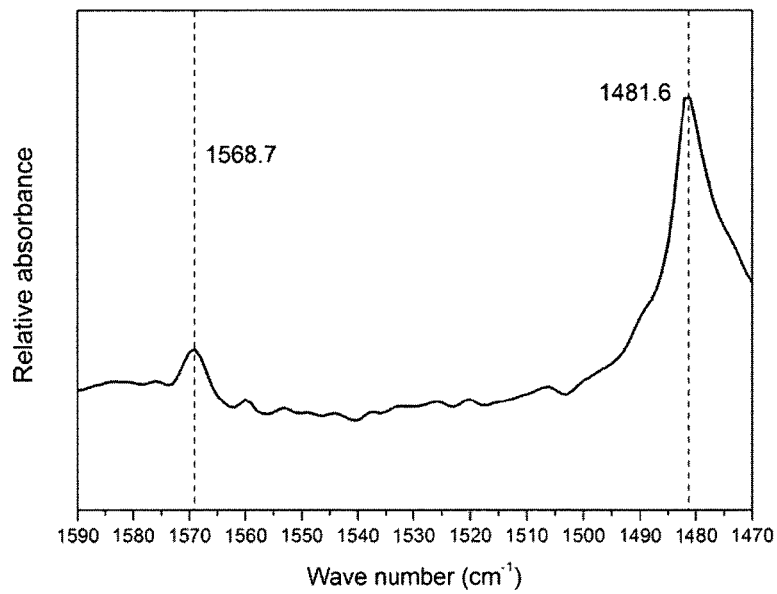
FIG. 6 shows FTIR spectrum of S2 in the 1590-1470 $cm^{-1}$ range, with S1 background subtracted.

FTIR and UV-Vis Analysis of Anolyte Solutions Before and after CV. FTIR analysis is conducted on the anolyte of the uncharged cell before (S1) and after (S2) charging. The spectra are shown in FIG. 5. In our previous study of $Li_x\beta(THF)_n$ solution, characteristic peaks of solvated electrons were at around 1600, 1568, 1323, 1157, 1107, 1005 and 988 $cm^{-1}$. In the current study, the only representative peak observed is at 1568.7 $cm^{-1}$. The absence of other typical peaks is due to the shortage of $Li^+$ in anolyte solutions. As a comparison, all the fingerprints related to LiSES show up in the FT-IR result of chemically prepared anolyte solutions (S3), which contains $Li^+$ in a large concentration. This indicates that peak at ~1568 $cm^{-1}$ is the most sensitive index to characterize the formation of LiSES within this specific chemical condition. Influence of Li concentration is also reflected from the peak shifting. The existing peak (from S1 and S2) located at 1481.6 $cm^{-1}$ shifts toward 1490.9 $cm^{-1}$ as seen in S3, in good correspondence with previously obtained results from $Li_x\beta(THF)_n$. This obvious shift is attributed to the more localized π electrons in the biphenyl aromatic rings. It should be pointed out that the truncated peak shape (e.g. at position of 1567.8, 1000-1100, and 850-950 $cm^{-1}$) is due to the overwhelmed intensity which is beyond the detectable range of the FT-IR equipment. The difference before and after charging was revealed in FIG. 6 after the subtraction of spectrum S1 from spectrum S2. LiSES can be formed in a two-step manner upon different amount of Li. With insufficient Li (i.e. excessive biphenyl in THF) which is more likely in this case, $Li_1\beta(THF)$ rather than $Li_2\beta(THF)$ prefers to form. In this structure, 1 Li atom reacts with 1 benzene ring in the biphenyl molecule. Since biphenyl consists of two benzene rings, this reaction gives rise to an asymmetric $Li_1\beta(THF)$ molecule which is IR-active. Therefore, increasing amount of $Li_1\beta(THF)$ would render increased intensity of its characteristic peaks. The observed peak at 1568.7 $cm^{-1}$ therefore indicates that increased amount of Li is trapped in the biphenyl aromatic rings in THF after charging. Moreover, the intensity increment of peak at 1481.6 is observed, also indicating more localized π electrons in the biphenyl aromatic rings.

To further prove the electrochemical generation of solvated electrons, UV-vis spectroscopy measurements are carried out on the anolyte solutions before $1^{st}$ charging (S1) and after $9^{th}$ charging (S2) are presented in FIG. 7. The emerging of the single absorbance peak centred at 306 nm in S2 is believed caused by the solvated electrons.

The completed tested cells have the following configurations:

Charged Cell: (−)Ni mesh/LiSES+LiI/LATP/$I_2$+$CH_3OH$+LiI/Ni mesh (+)

Fully uncharged cell (OCV=close to 0 V): (−)Ni mesh/Biphenyl+THF+LiI/LATP/$CH_3OH$+LiI/Ni mesh(+)

Electrochemical Measurements. A ceramic 1 kΩ resistor is used as the load for constant load cell discharge. An APPA 505 True RMS Multimeter cum data-logger is used to register the data points for the constant load discharge. A Basytec Battery Tester is used for the cyclic voltammetry of the uncharged cell.

FTIR and UV-VIS Analysis. An FT-IR spectrophotometer (Perkin-Elmer Spectrum One Spectrometer) with KBr window kit is used. Loading of samples into the KBr window is done in the glove box. After each test, the KBr window is cleaned using Chloroform and dried in a vacuum oven at 80° C. UV-vis spectroscopy measurements are carried out with a Shimadzu UV-2450 spectrometer using a scan speed of 400 nm/min. The baseline correction procedure is executed prior to each measurement session.

Discussion. Though the subject of using iodine as the cathode in lithium cells have been explored in the past, this is the first time iodine is used in methanol in conjunction with LiSES anode in a liquid cell at ambient temperature. Though the use of LiSES was proposed in the past by Sammells, ammonia was used as the electron receptor. During discharge, ammonia will change to gas which will lead to a pressure build-up in the cell. Hence, ammonia-based LiSES cells were not suitable for use at ambient temperature conditions. In recent years, Yazami patented the use of polyaromatic hydrocarbons (PAH) as electron receptors for LiSES (US Publication No. 2010/0141211). Our recent studies indicate that LiSES prepared using simple PAH such as biphenyl and naphthalene are stable at ambient temperature.

The electrochemical reactions taking place in a charged LiSES//$I_2$ cell is illustrated as follows:

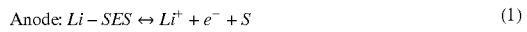

Anode: $Li - SES \leftrightarrow Li^+ + e^- + S$ (1)

Cathode: $Li^+ + e^- + \frac{1}{2}I_2 \leftrightarrow LiI$ (2)

Cell reaction $Li-SES + \frac{1}{2}I_2 \leftrightarrow LiI + S$ (3)

S=electron receptor+solvent

Equations (1) to (3) are electrochemical reactions taking place during charging/discharging of the cell.

Besides recharging, iodine can also be recovered from the spent catholyte which consists of colourless LiI in methanol simply by exposing it to air. The oxygen in the air oxidizes the iodide ions to iodine as follows:

Chemical reaction: $2LiI+O_2 \rightarrow Li_2O_2+I_2$ (4)

The LiSES//Air cell can be operated either with or without oxygen. In the absence of oxygen, only Eqn (3) is taking place during cell discharge. In the presence of oxygen, the following reactions are taking place at the cathode:

Electrochemical Reactions $2Li^+ + 2e^- + I_2 \rightarrow 2LiI$ (5)

$2Li^+ + 2e^- + O_2 \rightarrow Li_2O_2$ (6)

When the cathode chamber of the cell is exposed to air while the cell is discharged, the reactions in (5) and (6) are taking place continuously. However, the reduction of iodine in the catholyte solution takes precedence over the reduction of oxygen. Hence the main reaction occurring is (5). LiI formed on the cathode current collector dissolves readily in the methanol. This is actually an advantage in that the $Li_2O_2$ is not directly formed on the current collector electrochemically as in (6), which will passivate the current collector, but indirectly in the solution as in (4).

The rationale for preparing a cell in the uncharged state (OCV=close to 0 V) is as follows: Since LiSES is sensitive to oxygen and moisture and will react exothermically in the presence of water to produce hydrogen gas, to prepare LiSES at a chemical plant and transport it to various kiosks for sale might poise some safety hazard issues. It might therefore be safer if the starting solutions for preparing the LiSES are transported to kiosks and the LiSES is generated electrochemically on-site. The motivation behind using LiI salt as a base material is because solvated electrons can be generated electrochemically from LiCl salt and methylamine.

In summary, we have demonstrated for the first time the following: Firstly, we made a liquid Li-Air cell with OCV of ~3V that can operate at ambient temperature. Secondly, we have successful demonstrated the electrochemical formation of LiSES anolyte and $I_2$ catholyte in a full cell configuration. The presence of Li-SES was confirmed by two ways. The first is by qualitative test of adding the charged solution to dilute HCl to produce hydrogen gas. The second way is by FTIR and UV-VIS. This discovery allows us to build a Li-SES//$I_2$ cell that has purely liquid based anode and cathode in both charged and uncharged states for refuelable lithium battery applications. Finally, we have also introduced iodine in methanol as a solution that can function solely as catholyte or in the presence of oxygen, as a catalyst for oxygen reduction, which prevents the formation of passivating $Li_2O_2$ on the cathode current collector during discharge.

Figure 3C:
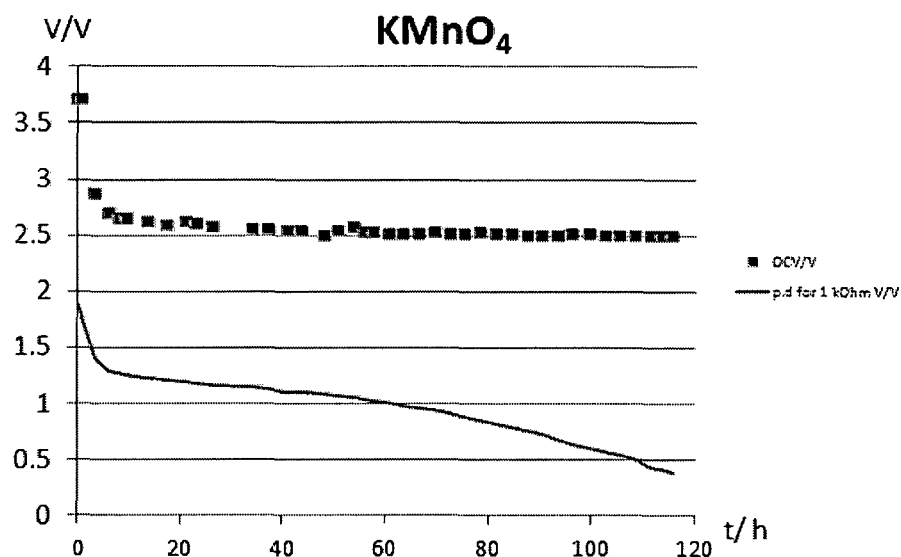
FIG. 3C shows cell discharge profiles OCV versus t and V versus t ($LiSES//KMnO_4$ cell).
Figure 3D:
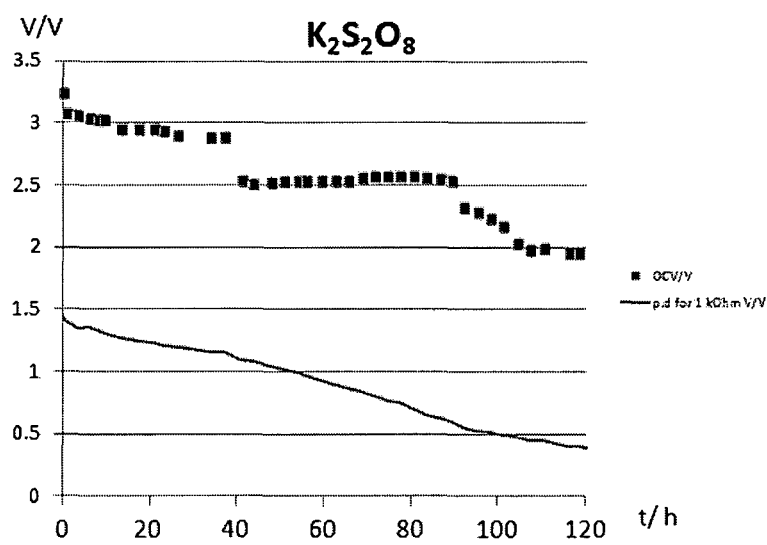
FIG. 3D shows cell discharge profiles OCV versus t and V versus t ($LiSES//K_2S_2O_8$ cell).
Figure 3E:
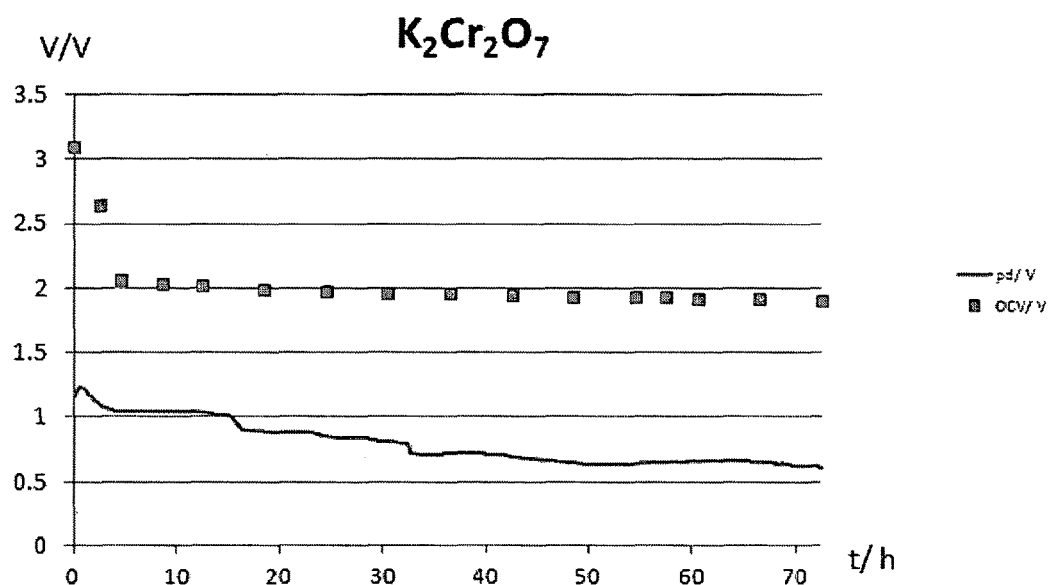
FIG. 3E shows cell discharge profiles OCV versus t and V versus t ($LiSES//K_2Cr_2O_7$ cell).

LiSES vs $KMnO_4$, $K_2S_2O_8$, $K_2Cr_2O_7$. Alternatives to iodine catholyte were explored. OCV measurements with 1.0 M/L LiSES(Biphenyl) and the following 0.150 M/L catholytes showed the following results:

$KMnO_4$ (acidified with 0.01 M/L $H_2SO_4$): OCV=3.762 V
$K_2S_2O_8$: OCV=3.235 V
$K_2Cr_2O_7$ (acidified with 0.01 M/L $H_2SO_4$): OCV=3.098 V Discharge curves using the respective catholytes are shown in FIGS. 3C, 3D and 3E.

Figure 10:
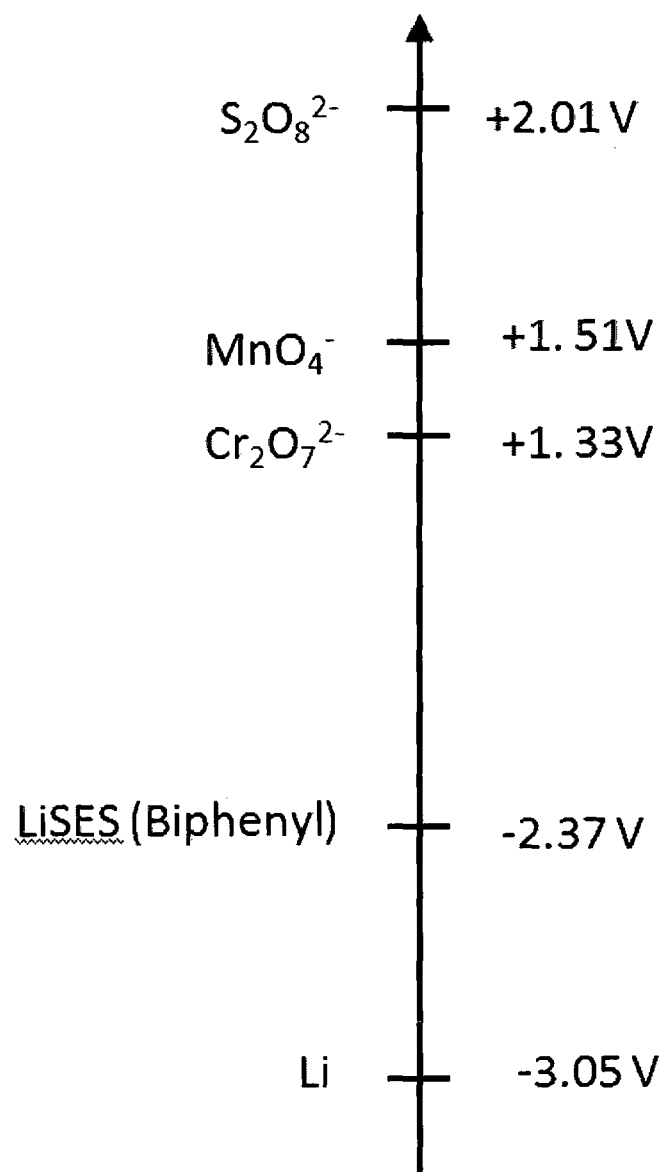
FIG. 10 provides a summary of the OCV values obtained using the various catholytes.

FIG. 10 provides a summary of the OCV values obtained using the various catholytes. As can be seen from the above, the OCV=3.76 V from LiSES//$KMnO_4$ presents the highest achievable OCV for any liquid lithium battery known to date.

Figure 8A:
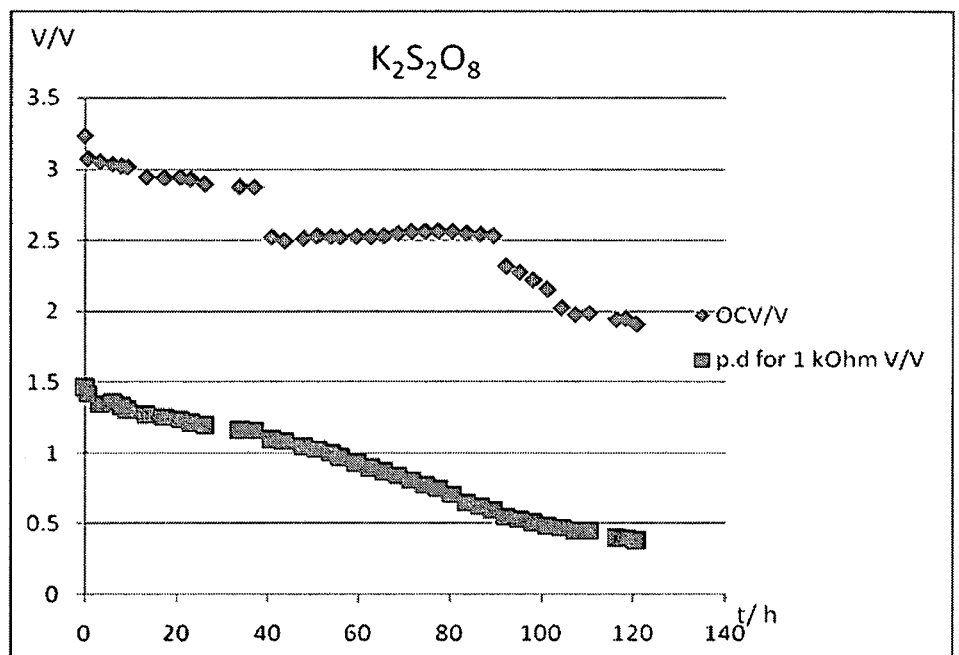
FIG. 8A shows OCV and potential difference across 1 kΩ resistor for $K_2S_2O_8$ containing catholyte.
Figure 8B:
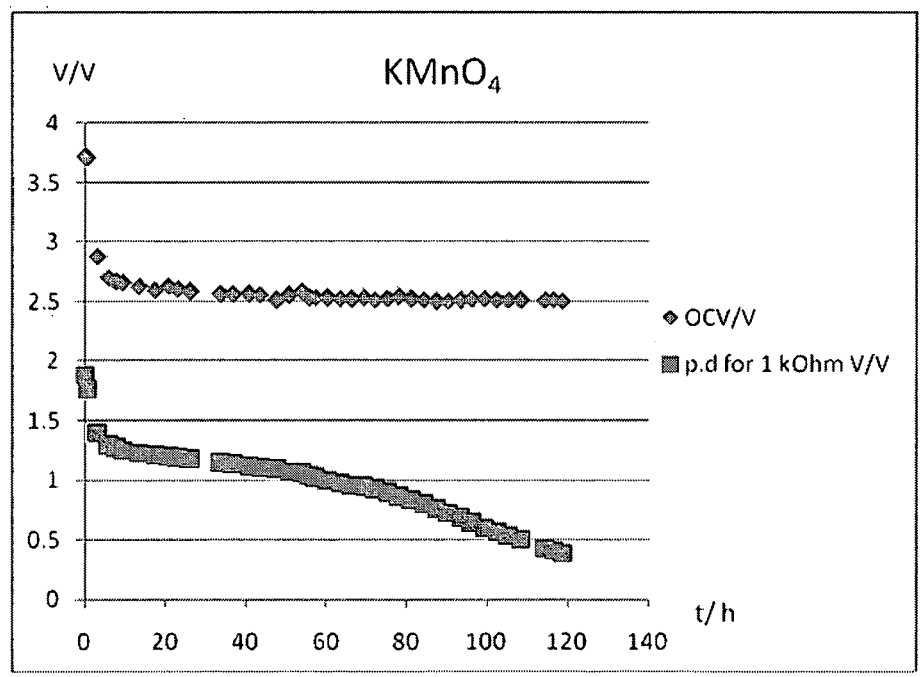
FIG. 8B shows OCV and potential difference across 1 kΩ resistor for $KMnO_4$ containing catholyte.

The OCV and potential difference measurements: Discharge across 1 kΩ resistor for $K_2S_2O_8$ and $KMnO_4$ are shown in FIG. 8A and FIG. 8B, respectively.

Qualitative Study of effect of $CuSO_4$ in methanol on LiI. 0.0479 g anhydrous $CuSO_4$ was first dissolved in 0.3 ml of water. Then the resulting solution was added to 30 ml methanol and stirred to successively form a light blue solution 0.01 M/L $CuSO_4$. To this light blue solution, 0.402 g anhydrous LiI (0.1 M/L LiI) was added. A dark brown solution was formed instantaneously with a suspension of particles. After centrifuge, a dark brown solution was obtained and the precipitate was mainly white in colour with traces of pale pink. The precipitate was added to distilled water to form a cloudy white suspension. The pH of the solution was determined to be ~7 using pH paper. Anhydrous LiI was weighed in glovebox and sealed in small ziplock bag before being taken out. $CuSO_4$ solutions were prepared outside glovebox because water is involved. It can be concluded that iodine was recovered instantaneously with some traces of precipitate that did not dissolve in water to give hydroxide ions.

OCV Measurements of Various Anolyte/Catholyte Combination. Cells were assembled according to the set-up of FIG. 1 and the OCV measured. The $CuSO_4$ solution was prepared using the second method described in previous paragraph.

(i) Anolyte: 1 M/L LiSES
Catholyte: LiI/$CH_3OH$
Catholyte chamber was not exposed to air. Whole assembly was done in glovebox in argon atmosphere. OCV: 2.49 V (ii) Anolyte: 1 M/L LiSES
Catholyte: LiI/$CH_3OH$+Air
Catholyte chamber cap was unscrewed and the content exposed to air. OCV: 2.58 V (iii) Anolyte: 1 M/L LiSES
Catholyte: $CuSO_4$(aq)/$CH_3OH$+Air
OCV: 2.88 V (iv) Anolyte: 1 M/L LiSES
Catholyte: $CuSO_4$(aq)/$CH_3OH$+Air+LiI
Comment: Anhydrous LiI was added to catholyte in (iii) after (iii)'s OCV measurement. OCV: 2.92 V The (ii) LiSES//LiI+$CH_3OH$ cell and the (iv) LiSES//$CuSO_4$(aq)+$CH_3OH$+LiI cell were kept for 8 hours. The catholyte caps of both cells were unscrewed but covered.

OCV of Cell (ii) after 8 hours is 2.51 V. No significant change in catholyte colour is noticed.

Figure 9:
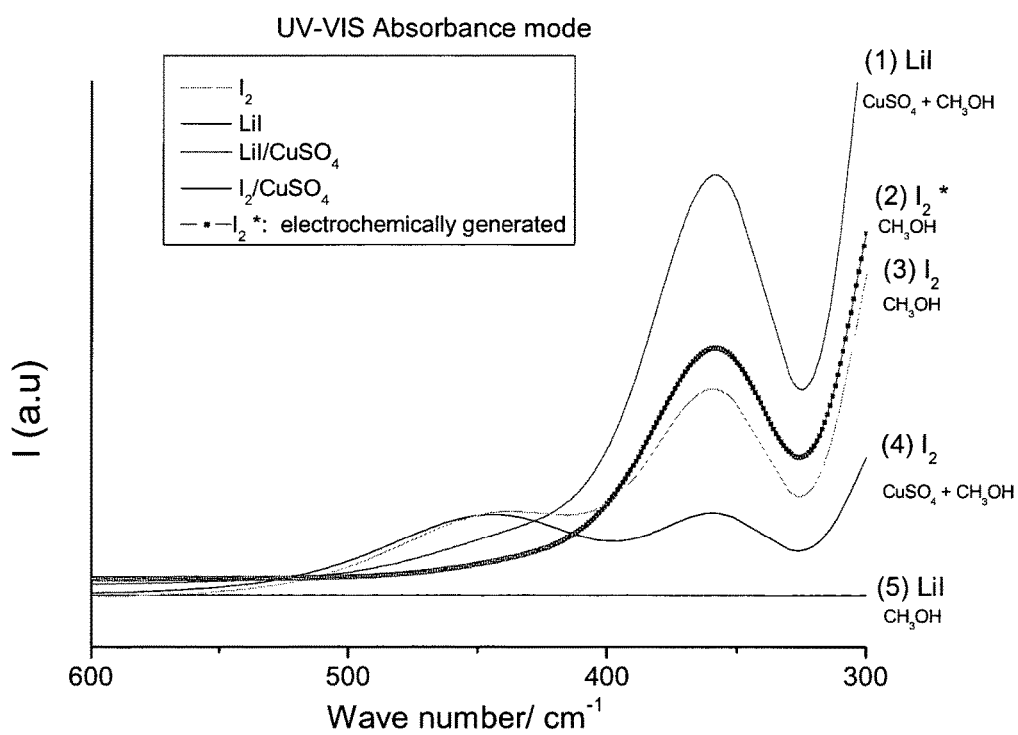
FIG. 9 shows UV-VIS of various catholyte solutions.

Oxygen ($O_2$) is next bubbled into the catholyte solution of Cell (iv) at 3 ml/min and stopped after certain time intervals. Then the OCVs are measured as follows:—
After 30 s of bubbling: OCV=2.93 V
After 90 s of bubbling: OCV=2.91 V
After 2 min of bubbling: OCV=2.82 V
After 15 min of bubbling: OCV=2.77 V After 50 min of bubbling: OCV=2.73 V
After 70 min of bubbling: OCV=2.72 V FIG. 9 shows UV-VIS of various catholyte solutions. Spectrum (2) shows the LiI in methanol after the catholyte has undergone CV charging for 6 cycles. Spectrum (5) shows the LiI in methanol before charging began. In the range 600 $cm^{-1}$ to 300 $cm^{-1}$, spectrum (5) does not have any peaks. Spectrum (3) is from a sample of iodine dissolved in methanol. Spectrum (2) matches spectrum (3) which indicates that iodine is formed electrochemically via charging.

For $CuSO_4$ Part. Spectrum (1) shows LiI dissolved into a solution of $CuSO_4$ in methanol. The spectrum shows iodine peaks corresponding to spectra (3) and (4). This indicates that iodide ions from LiI had been oxidized to iodine. Spectrum (4) comes from a sample of iodine dissolved in a solution.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A metal battery, comprising: a liquid anode comprising a first metal salt, an electron acceptor, and a first solvent, wherein the first metal salt and the electron acceptor are dissolved in the first solvent; a liquid cathode comprising a second metal salt, and a second solvent, wherein the liquid cathode further comprises an iodide when the metal battery is uncharged or iodine when the metal battery is charged and the second metal salt, iodide, and iodine are dissolved in the second solvent, and an electrolyte membrane separating the liquid anode and the liquid cathode, wherein each of the liquid anode and the liquid cathode is a solution containing no undissolved solid solutes.

2. The metal battery of claim 1, wherein the metal of the metal battery, first metal salt, and the second metal salt is independently selected from the group consisting of an alkali metal, an alkali-earth metal, and a lanthanide metal.

3. The metal battery of claim 2, wherein the metal is lithium, sodium, or magnesium.

4. The metal battery of claim 1, wherein the anion of the first metal salt is a halide.

5. The metal battery of claim 1, wherein the second metal salt has the formulae $M_pX_n$, wherein M represents the metal cation, n and p are stoichiometric coefficients, and X represents the anion, wherein X is selected from the group consisting of a halide, superoxide, peroxide, oxide, hexafluorophosphate, tetrafluoroborate, perchlorate, bis(oxalate)borate, trifluoromethanesulfonate, bis(trifluoromethanesulfonyl)imide (TFSI), sulfate, peroxosulfate, thiosulfate, permanganate, chromate, and dichromate.

6. The metal battery of claim 1, wherein the liquid anode does not contain a dissolved metal.

7. The metal battery of claim 1, wherein the liquid anode further comprises a dissolved metal.

8. The metal battery of claim 1, wherein the liquid cathode further comprises a dissolved metal halide.

9. The metal battery of claim 1, wherein the first metal salt and the second metal salt comprises lithium iodide.

10. The metal battery of claim 1, wherein the second solvent is selected from the group consisting of methanol, water, sulfolane, dichloromethane, hexane, and carbon tetrachloride, tetrahydrofuran, dimethyl ether, propylene carbonate, ethylene carbonate, dimethyl carbonate, diethyl carbonate, diethyl ether, formol, and formic acid.

11. The metal battery of claim 1, wherein the electron acceptor is a polycyclic aromatic hydrocarbon selected from the group consisting of biphenyl, naphthalene, azulene, 1-methylnaphthalene, acenaphthene, acenaphthylene, anthracene, fluorene, phenalene, phenanthrene, benzo[a]anthracene, benzo[a]phenanthrene, chrysene, fluoranthene, pyrene, tetracene, triphenylene anthanthrene, benzopyrene, benzo[a]pyrene, benzo[e]fluoranthene, benzo[ghi]perylene, benzo[j]fluoranthene, benzo[k]fluoranthene, corannulene, coronene, dicoronylene, helicene, heptacene, hexacene, ovalene, pentacene, picene perylene, tetraphenylene, and a mixture thereof.

12. The metal battery of claim 1, wherein the electron acceptor is selected from ammonia, polyaromatic-amines, metal-azaporphyrinates, diimines, methylamine, and a mixture thereof.

13. The metal battery of claim 12, wherein the electron acceptor is 2-amino anthracene, 1-amino anthracene, 2-amino-chrysene, or 1-napthylamine.

14. The metal battery of claim 1, wherein the electron acceptor is an alkyl radical, an alkene radical, or an alkyne radical.

15. The metal battery of claim 14, wherein the alkyl radical is a n-butyl radical or a tert-butyl radical.

16. The metal battery of claim 11, wherein the polycyclic aromatic hydrocarbon comprises at least one of biphenyl and naphthalene.

17. The metal battery of claim 1, wherein the first solvent is selected from the group consisting of comprises tetrahydrofuran, water, hexane, ethylene carbonate, propylene carbonate, benzene, carbon disulfide, carbon tetrachloride, diethyl ether, ethanol, chloroform, ether, dimethyl ether, benzene, propanol, acetic acid, alcohols, isobutylacetate, n-butyric acid, ethyl acetate, N-methylpyrrolidone, N,N-dimethyl formiate, ethylamine, isopropyl amine, hexamethylphosphotriamide, dimethyl sulfoxide, tetralkylurea, triphenylphosphine oxide, and a mixture thereof.

18. The metal battery of claim 1, wherein the liquid cathode is exposed to air or oxygen.

19. The metal battery of claim 1, wherein the liquid cathode further comprises an anionic receptor or a cationic receptor.

\* \* \* \* \*